(12) United States Patent
Lee et al.

(10) Patent No.: US 11,023,084 B2
(45) Date of Patent: Jun. 1, 2021

(54) TOUCH SENSOR, DISPLAY DEVICE INCLUDING THE SAME, AND METHOD OF MANUFACTURING TOUCH SENSOR

(71) Applicants: Samsung Display Co., Ltd., Yongin-si (KR); DONGWOO FINE-CHEM CO., LTD., Iksan-si (KR)

(72) Inventors: In Nam Lee, Yongin-si (KR); Dongpil Park, Incheon (KR); Jaehyun Lee, Uiwang-si (KR); Mi Young Kim, Yongin-si (KR); Sang Chui Lee, Yongin-si (KR)

(73) Assignees: SAMSUNG DISPLAY CO., LTD.; DONGWOO FINE-CHEM CO., LTD.

( * ) Notice: Subject to any disclaimer, the term of this patent is extended or adjusted under 35 U.S.C. 154(b) by 73 days.

(21) Appl. No.: 15/863,963

(22) Filed: Jan. 7, 2018

(65) Prior Publication Data
US 2018/0307346 A1 Oct. 25, 2018

(30) Foreign Application Priority Data
Apr. 19, 2017 (KR) .......................... 10-2017-0050664

(51) Int. Cl.
*G06F 3/044* (2006.01)
*G06F 3/041* (2006.01)

(52) U.S. Cl.
CPC .......... *G06F 3/0446* (2019.05); *G06F 3/0443* (2019.05); *G06F 3/04164* (2019.05); *G06F 2203/04103* (2013.01); *G06F 2203/04111* (2013.01); *G06F 2203/04112* (2013.01)

(58) Field of Classification Search
CPC ....................... G06F 3/041; G06F 2203/04111
See application file for complete search history.

(56) References Cited

U.S. PATENT DOCUMENTS

| 6,093,477 A * | 7/2000 | Matsufusa | G06F 3/044 178/18.03 |
| 2005/0184927 A1* | 8/2005 | Kwak | H01L 27/3276 345/45 |
| 2014/0307180 A1* | 10/2014 | Mischel, Jr. | G06F 3/044 349/12 |
| 2015/0311472 A1* | 10/2015 | Hong | H01L 51/5246 257/72 |

(Continued)

FOREIGN PATENT DOCUMENTS

| KR | 10-1586736 | 1/2016 |
| KR | 10-1586739 | 1/2016 |

(Continued)

*Primary Examiner* — Bryan Earles
(74) *Attorney, Agent, or Firm* — H.C. Park & Associates, PLC

(57) ABSTRACT

Disclosed is a touch sensor that includes a support layer including a touch area and a non-touch area surrounding the touch area, a sensing electrode part disposed on the support layer and in the touch area, and an insulating layer disposed in the touch area and a portion of the non-touch area. The insulating layer has a trench disposed along a perimeter of the touch area in the non-touch area. Also disclosed is a display device that includes the touch sensor and a method of manufacturing the touch sensor.

18 Claims, 14 Drawing Sheets

(56) References Cited

U.S. PATENT DOCUMENTS

| | | | |
|---|---|---|---|
| 2016/0103345 A1* | 4/2016 | Lee | G02F 1/1339 |
| | | | 349/110 |
| 2017/0040569 A1* | 2/2017 | Watabe | H01L 27/3244 |
| 2017/0336895 A1* | 11/2017 | David | G06F 3/045 |
| 2018/0107298 A1* | 4/2018 | Zhang | G06F 3/044 |
| 2018/0123084 A1* | 5/2018 | Kim | G06F 3/0412 |
| 2018/0159066 A1* | 6/2018 | Kong | H01L 27/1248 |

FOREIGN PATENT DOCUMENTS

| | | |
|---|---|---|
| KR | 10-1586740 | 1/2016 |
| KR | 10-2016-0053909 | 5/2016 |

\* cited by examiner

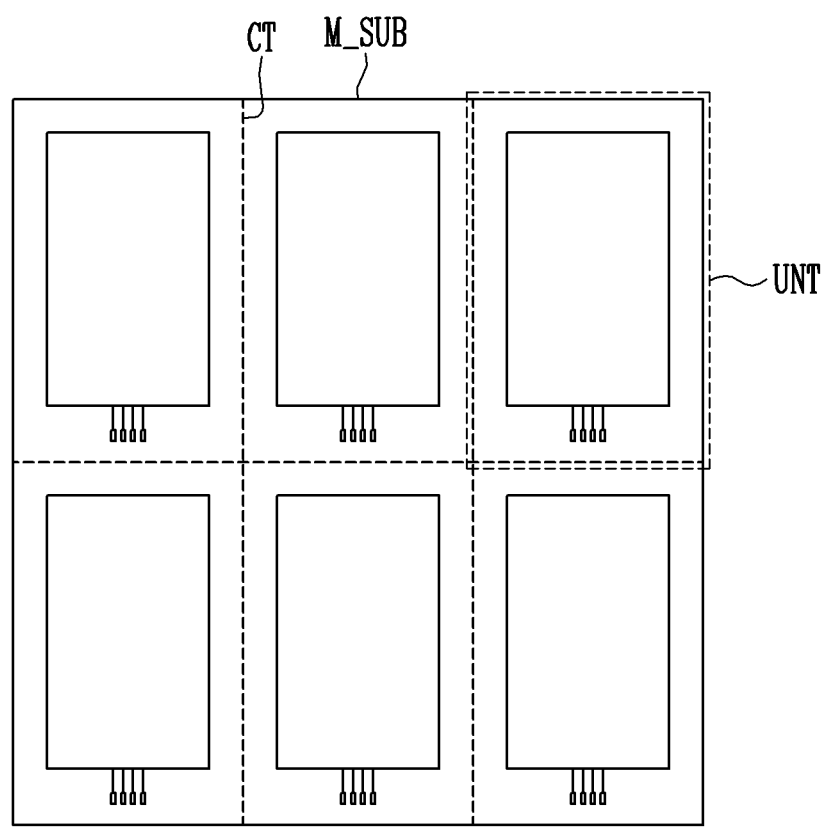

TOUCH SENSOR, DISPLAY DEVICE INCLUDING THE SAME, AND METHOD OF MANUFACTURING TOUCH SENSOR

CROSS-REFERENCE TO RELATED APPLICATION

This application claims priority from and the benefit of Korean Patent Application No. 10-2017-0050664, filed on Apr. 19, 2017, which is hereby incorporated by reference for all purposes as if fully set forth herein.

BACKGROUND

Field

Exemplary embodiments relate to a touch sensor, a display device including the same, and a method of manufacturing the touch sensor.

Discussion of the Background

Recently, consumers have shown a heightened interest in information display. In particular consumers have shown an increase in demand for use of portable information media (e.g., smart phones). To meet this demand, consumer electronics companies continue researching display devices to improve them and commercialize newer display devices with improved features.

Recent display devices include a touch sensor for receiving a touch input from a user together with an image display function. Accordingly, a user is able to more conveniently use the display device by using the touch sensor in place of a separate input (e.g., a mouse or a physical keyboard).

The above information disclosed in this Background section is only for enhancement of understanding of the background of the inventive concept. Therefore, it may contain information that does not form the prior art that was already known in this country to a person of ordinary skill in the art or that was publically available prior to an effective filing date of subject matter disclosed herein.

SUMMARY

Exemplary embodiments provide a touch sensor, in which a defect is decreased, and a display device including the same.

Exemplary embodiments provide a method of manufacturing a touch sensor, in which a defect is decreased.

Additional aspects will be set forth in the detailed description which follows, and, in part, will be apparent from the disclosure, or may be learned by practice of the inventive concept.

According to exemplary embodiments, a touch sensor includes a support layer including a touch area and a non-touch area surrounding the touch area, a sensing electrode part disposed on the support layer in the touch area, and an insulating layer in the touch area and a portion of the non-touch area. The insulating layer has a trench disposed along a perimeter of the touch area in the non-touch area.

According to other exemplary embodiments, a display device includes a display panel and a touch sensor provided on an upper surface of the display panel. The touch sensor includes a support layer including a touch area and a non-touch area surrounding the touch area; a sensing electrode part disposed on the support layer in the touch area; and an insulating layer disposed in the touch area and in a portion of the non-touch area, and the insulating layer has a trench disposed along a perimeter of the touch area in the non-touch area.

According to other exemplary embodiments, a method of manufacturing a touch sensor includes forming a support layer on a carrier substrate; forming a touch electrode pattern on the support layer; forming a touch sensor by forming an insulating layer on the touch electrode pattern; separating the touch sensor from the carrier substrate; and attaching the touch sensor onto a substrate. The insulating layer may be formed in a touch area and a non-touch area surrounding the touch area, and the insulating layer may have a trench disposed along a perimeter of the touch area in the non-touch area.

In the touch sensor according to the exemplary embodiment of the present disclosure and the display device adopting the touch sensor, a defect in a sensing electrode part and wires is decreased compared to a display device in the related art.

According to the exemplary embodiment of the present disclosure, it is possible to provide the method of easily manufacturing a touch sensor, in which a defect is decreased, by a roll-to-roll method.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 7 is a top plan view illustrating the case where the plurality of touch sensors is simultaneously manufactured according to an exemplary embodiment.

DETAILED DESCRIPTION OF THE ILLUSTRATED EMBODIMENTS

Figure 1:
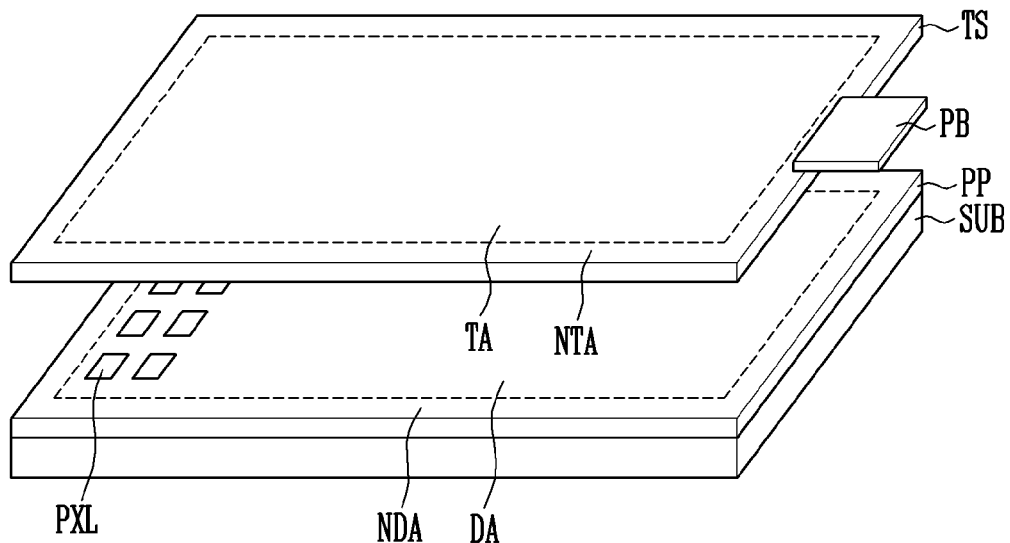
FIG. 1 is a perspective view illustrating a display device according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, exemplary embodiments will be described in detail in more detail with reference to the accompanying drawings.

FIG. 1 is a perspective view illustrating a display device according to an exemplary embodiment A display device according to an exemplary embodiment includes a display panel PP, and a touch sensor TS disposed on a front surface of the display panel PP.

The display panel PP displays predetermined visual information, for example, text, a video, a picture, and a 2D or 3D image, through the front surface. As long as a display panel displays an image, the kind of display panel PP is not particularly limited.

In the exemplary embodiment, the display panel PP may be one of an organic light emitting display panel, a liquid crystal display panel, an electrophoretic display panel, an electrowetting display panel, and a Micro ElectroMechanical System (MEMS) display panel. However, the kind of display panel PP is not limited thereto, and another display unit may be used so long as the display unit is in accordance with the inventive concepts of the present disclosure.

The display panel PP may be provided in various shapes, for example, a rectangular plate shape having two pairs of parallel sides. When the display panel PP is provided in the rectangular plate shape, sides of any one pair between the two pairs of sides may be provided to be longer than sides of the other pair. In the exemplary embodiment, for convenience of the description, the case where the display panel PP has a rectangular shape having a pair of long sides and a pair of short sides is present.

However, the shape of the display panel PP is not limited thereto, and the display panel PP may have various shapes. For example, the display panel PP may be provided in various shapes, such as a polygon having a closed shape including a straight side, a circle and an ellipse including a curved side, and a semicircle and a half ellipse including a side formed of a straight line and a curved line. In the exemplary embodiment, when the display panel PP has a straight side, at least a portion of the corners of each shape may be formed of a curved line. For example, when the display panel PP has the rectangular shape, a portion, in which the adjacent straight sides meet, may be replaced with a curved line having a predetermined curvature. That is, a vertex portion of the rectangular shape may be formed of a curved side, of which both adjacent ends may be connected to two adjacent straight sides and which has a predetermined curvature. The curvature may be differently set according to a position. For example, the curvature may be changed according to a start position of the curved line, a length of the curved line, and the like.

The entirety or at least a portion of the display panel PP may have flexibility. For example, the display panel PP may have flexibility in an entire area, or may have flexibility in an area corresponding to a flexible area.

The display panel PP includes a display area DA, in which pixels PX are disposed so that an image is displayed, and a non-display area NDA, which is positioned at least one side of the display area DA. For example, the non-display area NDA may surround the display area DA.

The display area DA may be provided in a shape corresponding to a shape of the display panel PP. For example, the DA may be provided in various shapes, such as a polygon having a closed shape including a straight side, a circle and an ellipse including a curved side, and a semicircle and a half ellipse including a side formed of a straight line and a curved line, like the shape of the display panel PP. In the exemplary embodiment, the display area DA may be provided in a rectangular shape.

In the display device according to the exemplary embodiment, the plurality of pixels PXL is disposed in the display area DA. The pixels PXL may be arranged in a matrix shape having rows and columns. However, the arrangement scheme of the pixels PXL may be differently set. In the exemplary embodiment, the pixel PXL may be any one of a blue pixel emitting blue light, a green pixel emitting green light, and a red pixel emitting red light. However, the color of light emitted by each pixel PXL is not limited thereto, and light of a different color, for example, magenta light, yellow light, cyan light, white light, and the like may also be emitted.

The touch sensor TS may be disposed on the display panel PP. The touch sensor TS detects a touch position and/or a touch pressure when a user touches the display panel. In the exemplary embodiment, the touch sensor TS may detect a fingerprint. The touch sensor may be a sensor of various schemes, for example, a capacitance method, a resistive method, and a piezoelectric method.

The touch sensor TS may be provided in a plate shape corresponding to the shape of the display panel PP, and covers at least a portion of the front surface of the display panel PP. For example, when the display panel PP is provided in a rectangular shape, the touch sensor TS may also be provided in a rectangular shape corresponding to the rectangular shape of the display panel PP. Otherwise, when the display panel PP is provided in a circular shape, the touch sensor TS may also be provided in a circular shape corresponding to the circular shape of the display panel PP.

The entirety or at least a portion of the touch sensor TS may have flexibility. For example, the touch sensor TS may have flexibility in an entire area, or may have flexibility in an area corresponding to a flexible area.

The touch sensor TS may include a touch area TA, which is capable of detecting a touch of a user, and a non-touch area NTA disposed at least at one side of the touch area TA. In the exemplary embodiment, the non-touch area NTA surrounds the touch area TA.

The touch area TA may correspond to the display area DA. The non-touch area NTA may correspond to the non-display area NDA. Accordingly, when viewed on a plane, the touch area TA and the display area DA may overlap each other and the non-touch area NTA and the non-display area NDA may also overlap each other. However, the sizes or the shapes of the touch area TA and the non-touch area NTA are not limited thereto. For example, the touch area TA may be extended to a portion of the non-display area NDA.

In the exemplary embodiment, the touch sensor TS may include a printed circuit board PB, which is disposed in the non-touch area NTA and is electrically connected to one or more touch electrodes.

A sensor controller controlling the touch sensor TS may be disposed on the printed circuit board PB. The sensor controller may control an operation of the touch sensor. In the exemplary embodiment, the sensor controller may detect capacity or resistance of the touch sensor TS to detect a touch position and/or a touch pressure from a user's finger or object held by the user (e.g., a stylus pen).

Although it is not illustrated, an adhesive may be disposed between the touch sensor TS and the display panel PP. The adhesive may bond two the touch sensor TS and the display panel PP, which are adjacent constituent elements. In the exemplary embodiment, the adhesive may serve to bond two adjacent constituent elements into one form, and disperse stress applied to the two constituent elements. To this end, the adhesive may be selected from adhesives having bonding force and elasticity of predetermined ranges. Various adhesives of various thicknesses may be used as the adhesive mentioned in the present specification so long as they satisfy the aforementioned function.

In the exemplary embodiment, the term "adhesive" is used to denote an element that is provided between two adjacent constituent elements to connect them. The term "adhesive" includes a pressure-sensitive adhesive, which merely physically combines two constituent elements, but does not chemically combine the two constituent elements to allow the two constituent elements to be separated. The term "adhesive" also includes a non-pressure-sensitive adhesive or one that physically and chemically combines two adjacent constituent elements and bonds the two constituent elements to be in a non-separable state. The actual type of adhesive may be vary depending on whether the purpose is to permanently bond adjacent constituent elements or whether to remove adjacent constituent elements later through a peel-off method, and hereinafter, both the former and the latter are indicated as the adhesives.

The adhesive between the touch sensor TS and the display panel PP may be a pressure-sensitive adhesive, which enables the touch sensor TS and the display panel PP to be peeled off.

The adhesive may include an optically transparent adhesive which allows an image to maximally pass through from the display panel PP. The adhesive may include one or more materials selected from the group consisting of polyester, polyether, polyurethane, epoxy, silicon, and acryl.

However, the touch sensor TS may be laid on the display panel PP with the adhesive or may be directly laid on the display panel PP. If directly laid on the display panel PP, the adhesive may not be disposed between the touch sensor TS and the display panel PP.

Hereinafter, the display device according to the exemplary embodiment will be described based on the touch sensor TS with reference to FIGS. 2, 3A, 3B, and 3C.

Figure 2:
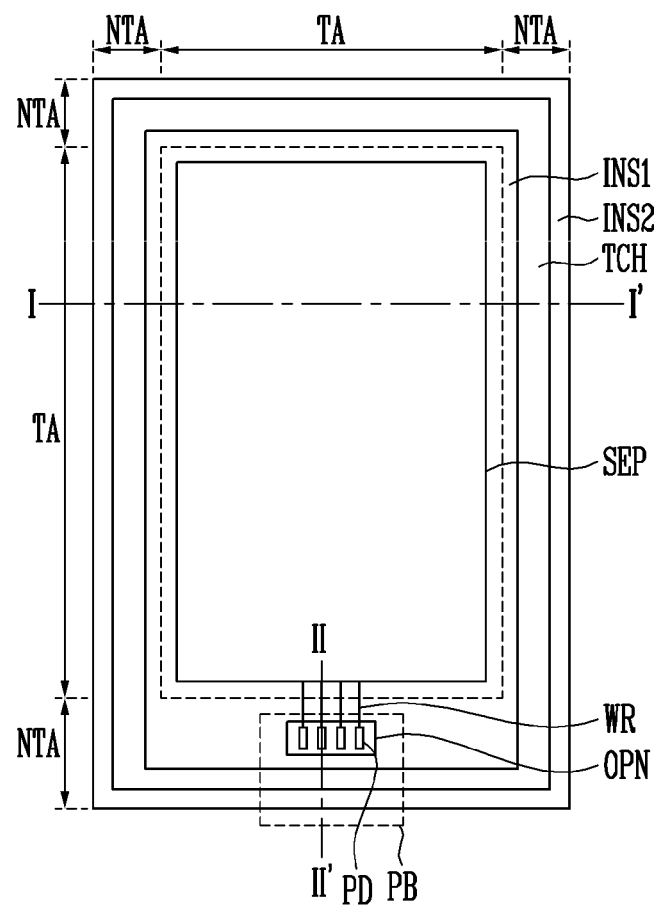
FIG. 2 is a top plan view illustrating a touch sensor according to an exemplary embodiment.
Figure 3A:
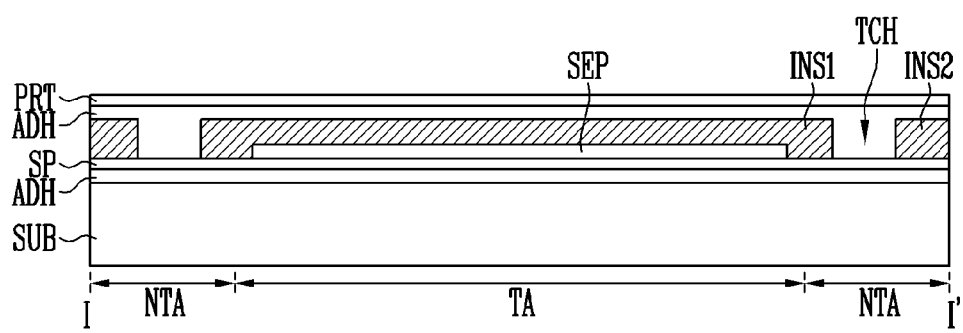
FIG. 3A is a cross-sectional view taken along line I-I' of FIG. 2.
Figure 3B:
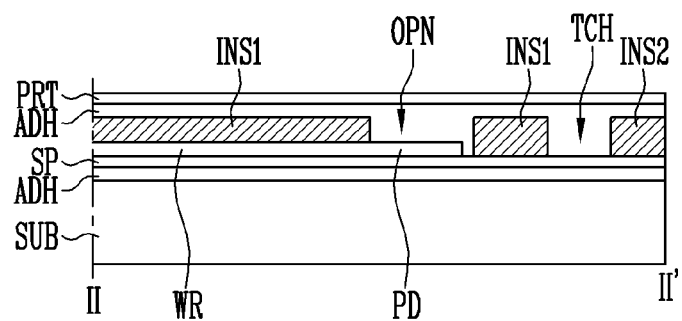
FIG. 3B is a cross-sectional view taken along line II-II' of FIG. 2.
Figure 3C:
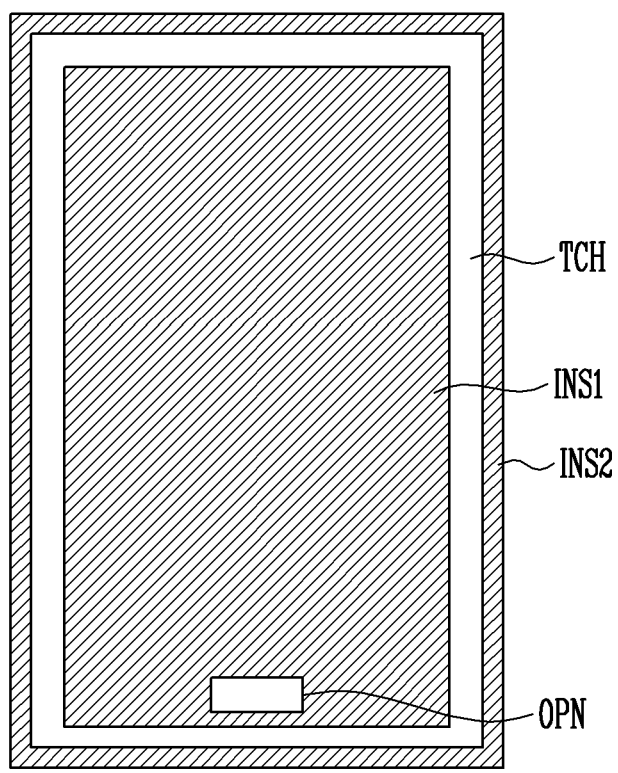
FIG. 3C is a top plan view of the touch sensor, and illustrates only an insulating layer.

FIG. 2 is a top plan view illustrating the touch sensor according to the exemplary embodiment. FIG. 3A is a cross-sectional view taken along line I-I' of FIG. 2, FIG. 3B is a cross-sectional view taken along line II-II' of FIG. 2, and FIG. 3C is a top plan view of the touch sensor, and illustrates only an insulating layer.

Referring to FIGS. 2, 3A, 3B, and 3C, the touch sensor includes a support layer SP that includes the touch area TA and the non-touch area NTA surrounding the touch area TA, a sensing electrode part SEP disposed in the touch area TA of the support layer SP, wires connected to the sensing electrode part SEP, and an insulating layer INS covering the touch area and a portion of the non-touch area NTA.

In the exemplary embodiment, a substrate SUB, to which the touch sensor TS is attached, may be disposed at an external side of the support layer SP.

The support layer SP includes the touch area TA and the non-touch area NTA. The sensing electrode part SEP may be disposed on the touch area TA of support layer SP. The non-touch area NTA of the support layer SP may be adjacent to at least one side of the touch area TA.

In the exemplary embodiment, the touch sensor TS is disposed on the substrate SUB. Each element described below will be described according to a lamination sequence.

The substrate SUB may be various elements. For example, the substrate SUB may be an encapsulation layer disposed on a uppermost portion of the display panel PP, a functional film, such as a polarizing film or a phase difference film, and a window disposed on the front surface of the display panel PP. As another example, the substrate SUB may be an insulating substrate, and in this case, the insulating substrate may be formed of an insulating material, such as glass and resin. As another example, the substrate may be formed of a material having flexibility so as to be bendable or foldable, and may have a single-layer structure of a multi-layer structure. Particularly, the substrate SUB may be a film including a thermoplastic resin, such as a polyester-based resin including polyethylene terephthalate, polyethylene isophthalate, and polybutylene terephthalate, a cellulose-based resin including diacetyl cellulose and triacetyl cellulose, a polycarbonate-based resin, an acryl-based resin including polymethyl(meta) acrylate and polyethyl (meta) acrylate, a styrene-based resin including polystyrene and acrylonitrile-styrene copolymer, a polyolefin resin including polyethylene, polypropylene, and cyclo-based or norbornene-based structure, a polyolefin-based resin including an ethylene propylene copolymer, a vinyl chloride-based resin, a poly amide-based resin including nylon and aromatic polyamide, an imide-based resin, a polyether sulfone-based resin, a sulfone-base resin, a polyetherketone-based resin, a polyphenylene sulfide, a vinyl alcohol-based resin, a vinylidene chloride resin, a vinyl butyric resin, an arylate-based resin, a polyoxymethylene resin, and an epoxy-based resin, and also be a film including a blended material of the thermoplastic resins. As a further example, the substrate SUB may also use a film formed of thermosetting resin such as a (meta)acryl-based resin, a urethane-based resin, an acryl urethane-based resin, an epoxy-based resin, and a silicone-based resin, or an ultraviolet curable resin. However, the material of the substrate may be variously changed, and the substrate may be formed of Fiber Glass Reinforced Plastic (FRP) and the like.

The support layer SP is disposed on the substrate SUB. The sensing electrode part SEP, the wires WR, pads PD, and the like, which are to be described below, are directly formed on an upper surface of the support layer SP.

The support layer SP may be formed of an organic material having flexibility, and may have a single-layer structure of a multi-layer structure. For example, the support layer SP may be selected from the materials of the substrate SUB, and the substrate SUB and the support layer SP may be formed of the same material or different materials. In the exemplary embodiment, the support layer SP may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, cellulose acetate propionate, polyamide, polyamic acid, polyethylene, polystyrene, polynorbornene, polymaleimide copolymer, polyazobenzene, polyphenylenephthalamide, polyester, cinnamate-based polymer, coumarin-based polymer, phthalimidine-based polymer, chalcone-based polymer, cyclo polyolefin-based polymer, and aromatic acetylene-based polymer materials.

The support layer SP may have various refractive indexes according to a material used. When the support layer SP is formed in a single layer or a multi-layer, the support layer SP may further include a refractive index matching layer, or the support layer SP itself may be used as a refractive index matching layer. Otherwise, the support layer SP or the refractive index matching layer may include a high refractive material, for example, nano particles.

The support layer SP serves as a separation layer during the manufacturing of the touch sensor TS, which will be described below in a method of manufacturing the touch sensor TS.

An adhesive ADH connecting the substrate SUB and the support layer SP may be provided between the support layer SP and the substrate SUB. The adhesive ADH may be an optically transparent adhesive ADH allowing an image from the display panel PP to maximally pass through. Here, the adhesive ADH provided between the substrate SUB and the support layer SP may be a photocurable adhesive hardened by light, such as ultraviolet rays, and may permanently bond the substrate SUB and the support layer SP through hardening.

The sensing electrode part SEP is disposed on the support layer SP in the touch area TA. The sensing electrode part SEP includes one or more touch electrodes.

The wire WR is connected to the sensing electrode part SEP. The wire WR may provide a signal to the sensing electrode part SEP or connect a signal from the sensing electrode part SEP to the touch controller. The wire WR may be disposed in the non-touch area NTA. A portion of the wire WR (or one of many wires WR) may be disposed in the touch area TA so to the sensing electrode part SEP. The pad PD to be connected to the printed circuit board PB and the like may be disposed at an end of the other side of the wire WR that is not connected to the sensing electrode part SEP.

The sensing electrode part SEP and the wire WR may be provided in various forms according to the type of touch sensor TS. For example, the sensing electrode part SEP, the wire WR, and the pad PD may be implemented to detect a touch by a mutual capacitance method or a self-capacitance method. In this case, the touch electrodes may be implemented in a polygon, for example, a quadrangular shape including a rectangle, a trapezoid, and a diamond. Otherwise, each of the touch electrodes may be implemented in a circular shape. Otherwise, each of the touch electrodes may be extended in a predetermined direction, so that the entire touch electrodes may have a stripe shape. The extension direction of some of the touch electrodes may be a long side direction (e.g., vertical), a short side direction (e.g., horizontal), or an inclined direction (e.g., oblique).

The sensing electrode part SEP, the wires WR, and/or the pad PD may be formed of at least one of conductive materials, such as metal, a metal oxide, conductive polymer, metal nano wire, carbon nano tube, and graphene.

The metal may include at least one of cooper, silver, gold, platinum, palladium, nickel, tin, aluminum, cobalt, rhodium, iridium, iron, ruthenium, osmium, manganese, molybdenum, tungsten, niobium, tantalum, titanium, bismuth, antimony, lead, zinc, and an alloy thereof.

In the exemplary embodiment, a material of at least one of the sensing electrode part SEP, the wires WR, and the pad PD may include a silver/palladium/copper alloy. Otherwise, a material of at least one of the sensing electrode part SEP, the wires WR, and the pad PD may be a nickel/copper alloy or a conductive metal oxide.

The conductive metal oxide may include at least one of transparent metal compounds, such as an Indium Tin Oxide (ITO), an Indium Zinc Oxide (IZO), an Antimony Zinc Oxide (AZO), an Indium Tin Zinc Oxide (ITZO), a Zinc Oxide (ZnO), and a Tin Oxide ($SnO_2$), in addition to the aforementioned oxides of the metal. The conductive polymer may include a polythiophene-based compound, a polypyrrole-based compound, a polyaniline-based compound, a polyacetylene-based compound, and a polyphenylenether-based compound, and a mixture thereof, and particularly, may include a PEDOT/PSS compound among the polythiophene-based compounds.

In the drawings, the sensing electrode part SEP is illustrated as a single layer for convenience. However, the sensing electrode part SEP, the wires WR, and the pad PD may be provided as a single layer or a multi-layer. In the exemplary embodiment, the sensing electrode part SEP, the wires WR, and the pad PD may be formed of the same number of layers, but are not limited thereto and may also be formed of different layers.

For example, the sensing electrode part SEP may be formed as a single layer, and the wires WR and/or the pad PD may be formed of a multi-layer. Otherwise, a portion of the sensing electrode part SEP may be formed as a single layer and the other portion of the sensing electrode part SEP may be formed as a multi-layer, and the wires WR and/or the pad PD may be formed as a multi-layer. Otherwise, a portion of the sensing electrode part SEP may be formed as a single layer and the other portion of the sensing electrode part SEP may be formed as a multi-layer, and the wires WR and/or the pad PD may be formed as a single layer.

In the exemplary embodiment, the sensing electrode part SEP, the wires WR, and the pad PD may be formed of the same material, but are not limited thereto and may also be formed of different materials.

For example, the sensing electrode part SEP, the wires WR, and the pad PD may be formed of only a conductive metal oxide. Otherwise, the sensing electrode part SEP may be formed of a conductive metal oxide, and the wires WR and/or the pad PD may be formed of metal. Otherwise, the sensing electrode part SEP may be formed of a conductive metal oxide, and the wires WR and/or the pad PD may be formed of a conductive metal oxide and a metal alloy. Otherwise, the sensing electrode part SEP may be formed of nano wires, and the wires WR and/or the pad PD may be formed of metal.

The insulating layer INS is provided on the substrate SUB. Particularly, the insulating layer INS covers the sensing electrode part SEP in the touch area TA, and covers a portion of the support layer SP in the non-touch area NTA. The insulating layer INS may be formed in various thicknesses. For example, the insulating layer INS may have a thickness of about 1 μm to about 10 In the exemplary embodiment, the insulating layer may have a thickness of about 3 μm to about 4 μm.

The insulating layer INS has an opening OPN exposing the pad PD connected to the end of the wire WR. That is, the opening OPN is provided in an area in which the pad PD is disposed. In the present exemplary embodiment, it is illustrated that one opening OPN is provided in a quadrangular shape, but is not limited thereto, and may be provided with different shapes and different numbers so long as the pad PD is sufficiently exposed. The pad PD may be connected to the sensor controller through a separate wire, a flexible printed circuit board, a tape carrier package, a connector, a chip on film, and the like through the opening OPN. For example, the pad PD may be connected to other elements through an anisotropic conductive film and the like disposed in the opening OPN.

A trench TCH, which is formed by removing a portion of the insulating layer INS in the non-touch area NTA, is provided. The insulating layer INS is not provided on the support layer SP in an area corresponding to the trench TCH, so that an upper surface of the support layer SP is exposed.

The insulating layer INS is not provided on the support layer SP in the area corresponding to the trench TCH. A width of the trench TCH may be changed according to a height of the insulating layer, and may be about 30 μm to about 70 and in the exemplary embodiment, a width of the trench TCH may be about 50 The trench TCH is formed to have the width of the aforementioned range, so that it is possible to prevent the adhesive ADH from being from being insufficiently applied (including not being applied) to a portion, to which the insulating layer is not provided, during a roll-to-roll compressive transfer process to be described below. Further, the trench TCH has the width of the aforementioned range, so that it is possible to prevent bubbles from being generated in the portion of the trench TCH.

The trench TCH is provided along a perimeter of the touch area TA when viewed on a plane. Accordingly, the insulating layer INS may be separated into two insulating layers INS1 and INS2 with the trench TCH interposed therebetween. The first insulating layer INS1 covers the touch area TA and a portion of the non-touch area NTA. The second insulating layer INS2 covers a portion of the non-touch area NTA. The second insulating layer INS2 is also spaced apart from the first insulating layer INS1 and provided along a perimeter of the first insulating layer INS1 at an external side of the first insulating layer INS1.

The first insulating layer INS1 and the second insulating layer INS2 have substantially the same height. The second insulating layer INS2 serves as a spacer for maintaining a height of the insulating layer at an end portion of the non-touch area NTA. Because of its height and position, the second insulating layer INS2, may prevent the adhesive ADH from being insufficiently applied during a manufacturing process of the touch sensor. For example, the second insulating layer INS2 may prevent the adhesive ADH from being insufficiently applied during a process of compressing and transferring the touch sensor TS in a roll-to-roll method.

The insulating layer has an opening OP exposing an upper surface of the pad PD in an area, in which the pad PD is formed. The opening OPN may be disposed within the first insulating layer INS1 of the non-touch area NTA. The pad PD may be connected to the sensor controller through other separate wires WR, a flexible printed circuit board, a tape carrier package, a connector, a chip on film, and the like through the opening OPN.

The insulating layer INS may include at least one of an organic material and an inorganic material, and may have a single layer structure or a multi-layer structure. In the exemplary embodiment, an organic material forming the support layer may be used as a material of the organic layer. In the exemplary embodiment, the material of the insulating layer may include an organic material, such as a fluorobased carbon compound, such as Teflon, polyepoxy, and benzocyclobutene, in addition to the organic material, and the inorganic layer may use an inorganic insulating material, such as polysiloxane, a silicon nitride, a silicon oxide, and a metal oxide including an aluminum oxide.

In the exemplary embodiment, a protection film PRT may be provided on the insulating layer INS with the adhesive ADH interposed therebetween. In the present exemplary embodiment, it is illustrated that a thickness of the adhesive ADH is not that much larger than a thickness of the protection film PRT, but this is for convenience only. In the exemplary embodiment, a thickness of the protection film PRT may be larger than a thickness of the adhesive ADH.

The protection film PRT is may protect the touch sensor TS during the process of manufacturing the touch sensor TS and/or until the touch sensor TS is manufactured and then is delivered to a user. The touch sensor TS may be a complete product or a product in an intermediate operation for manufacturing to complete.

The adhesive ADH may be disposed on the protection film PRT protecting the surface of the touch sensor TS. The adhesive ADH may bond adjacent elements of the protection film PRT and the touch sensor TS. The adhesive ADH may include one or more materials selected from the group consisting of polyester, polyether, polyurethane, epoxy, silicon, and acryl.

The adhesive ADH between the insulating layer and the protection film PRT may be a pressure-sensitive adhesive, which physically combines two constituent elements, but does not chemically combine the two constituent elements to allow the two constituent elements to be separated.

The protection film PRT is bonded to one surface of an adherend to protect the adherend. The protection film PRT may be removed when the touch sensor TS is attached to another element. The adhesive ADH may be removed together with the protection film PRT when the protection film PRT is removed. The pad PD may be connected with separate wires WR, a flexible printed circuit board, a tape carrier package, a connector, a chip-on film, or the like after the protection film PRT and the adhesive ADH are simultaneously removed.

However, only the protection film PRT may be removed and the adhesive ADH may be left on the touch sensor as it is, and another element may be attached onto the adhesive ADH. That is, the protection film PRT is removed, so that one surface of the adhesive ADH is exposed, and the exposed surface of the adhesive ADH may be attached to another element. In this case, the protection film PRT and the adhesive ADH may be provided only to a portion excluding the pad PD.

As long as the protection film PRT protects an adhesive, the protection film PRT is sufficient, and is not particularly limited. The protection film PRT may be formed of various materials, for example, a metal sheet, an organic polymer sheet, and a rubber sheet.

The protection film PRT according to the exemplary embodiment may be formed of an organic polymer. The organic polymer may include at least one of, for example, polyethylene, polypropylene, an ethylene-propylene copolymer, an ethylene-vinyl acetate copolymer, an olefin-based polymer, polyethylene terephthalate, polyethylene naphthalate, polybutylene terephthalate, polycarbonate, polyvinyl chloride, a vinyl acetate based polymer, polyphenylene sulfide, polyamide (nylon), polyamide, polyimide, polyetheretherketone, and polyether, but is not limited thereto. The material of the substrate SUB, the material of the support layer SP, and the material of the insulating layer INS may be used as the material of the protection film PRT within a limit of protecting an adherend.

In the touch sensor according to the exemplary embodiment, the insulating layer having the trench TCH may be provided in various forms when viewed on a plane. In the exemplary embodiment below, in order to avoid the overlapping of the description, different matters from those of the aforementioned exemplary embodiment will be mainly described. Non-described parts follow the parts of the described exemplary embodiment.

Figure 4A:
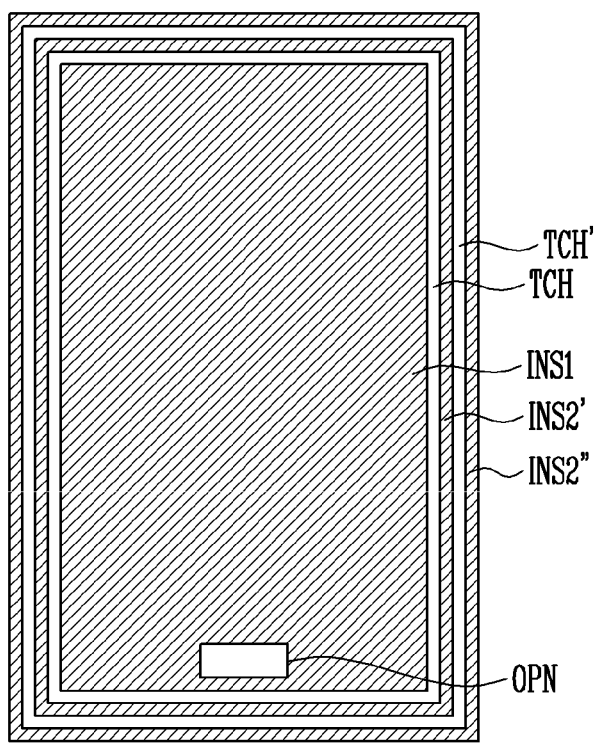
FIGS. 4A and 4B are top plan views illustrating touch sensors according to exemplary embodiments.
Figure 4B:
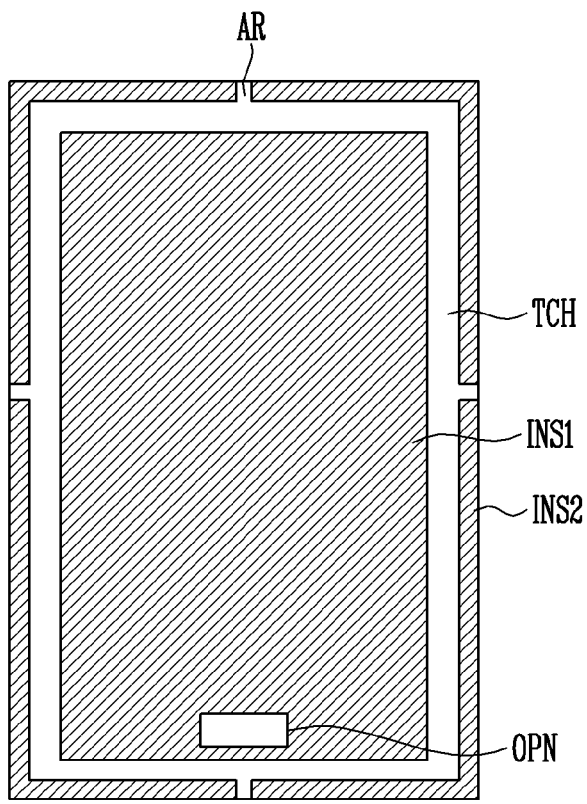

FIGS. 4A and 4B are top plan views illustrating touch sensors according to exemplary embodiments.

Referring to FIG. 4A, an insulating layer has trenches TCH formed by removing a portion of the insulating layer in a non-touch area NTA, and the number of trenches TCH may be two or more. In the present exemplary embodiment, the case where the two trenches TCH are formed is illustrated as an example.

The insulating layer is not provided on a support layer SP in an area corresponding to the trench TCH. The trench TCH is provided with a width in a degree, in which an adhesive ADH is prevented from being non-applied or from being insufficiently applied to a portion, in which the insulating layer is not provided, in a roll-to-roll compressive transfer process. The roll-to-roll compressive transfer process will be described below.

The trench TCH may have an internal trench TCH and an external trench TCH' provided along a perimeter of the touch area TA. In this case, the insulating layer has three insulating layers INS1, INS2', and INS2", which are spaced apart from one another by the internal trench TCH and the external trench TCH'. The innermost insulating layer INS1 completely covers the touch area TA, and covers a portion of the non-touch area NTA along the perimeter of the touch area TA. The center insulating layer INS2' is a ring shape closed along a perimeter of the innermost insulating layer INS1, and surrounds the innermost insulating layer INS1. The outer insulating layer INS2" is a ring shape closed along a perimeter of the center insulating layer INS2', and surrounds the center insulating layer INS2'.

Referring to FIG. 4B, the insulating layer has a trench TCH formed by removing a portion of the insulating layer in the non-touch area NTA, and an air path AR, through which air is dischargeable to the outside, may be provided in the trench TCH. One or two or more air paths AR may be provided, and a position thereof is not particularly limited. The air path AR connected to the trench TCH enables air from portions where the insulating layer is not provided (e.g., the trench) to be easily discharged to the outside during the roll-to-roll compressive transfer process. When an air layer or air drops are non-uniformly present within the trench TCH, the adhesive may be non-uniformly applied during the roll-to-roll compressive transfer process, so that the air path AR enables air to be easily discharged to the outside, thereby decreasing the non-uniform application of the adhesive.

Figure 5A:
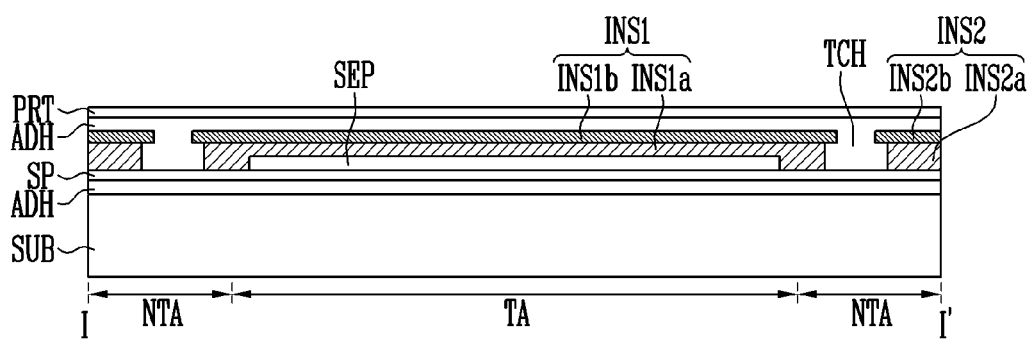
FIGS. 5A, 5B, 5C, and 5D are cross-sectional views illustrating touch sensors according to exemplary embodiments.
Figure 5B:
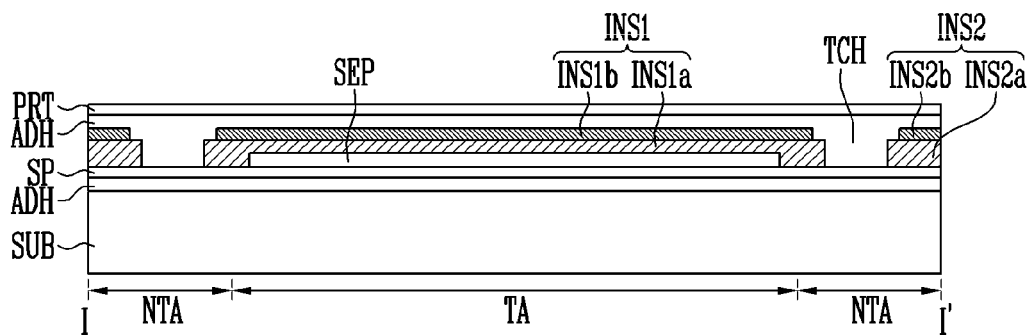
Figure 5C:
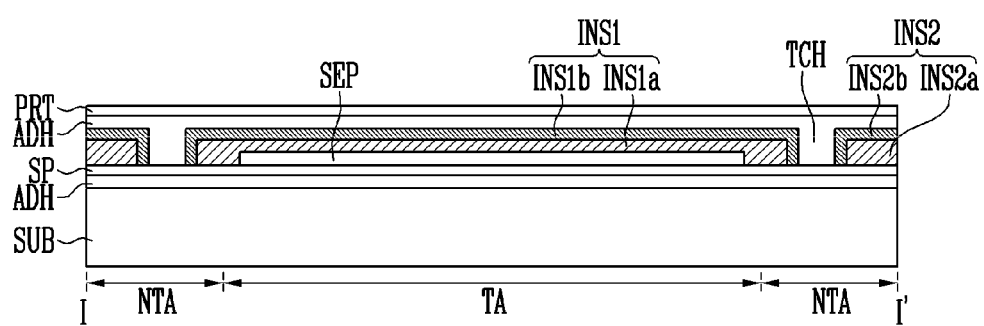
Figure 5D:
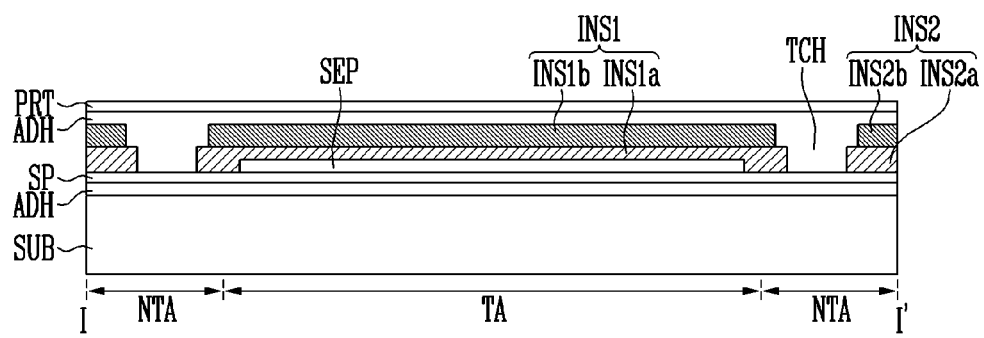

The touch sensor according to the exemplary embodiment may be implemented in various forms. FIGS. 5A and 5D are cross-sectional views illustrating touch sensors according to exemplary embodiments, and are cross-sectional views taken along line I-I' of FIG. 2.

Referring to FIG. 5A, in a touch sensor according to an exemplary embodiments, an insulating layer INS may be provided with multiple layers. The insulating layer INS having multiple layers may have dual layers or three or more layers. In the exemplary embodiment, the case where the insulating layer is formed of a first insulating layer INS1 and a second insulating layer INS2, which are spaced apart from each other with a trench TCH interposed therebetween, will be described.

The first insulating layer INS1 is disposed on a sensing electrode part SEP, and includes a first sub insulating layer INS1a and a second sub insulating layer INS1b which are sequentially laminated. The second insulating layer INS2 also includes a first sub insulating is layer INS2a and a second sub insulating layer INS2b which are sequentially laminated.

In the first insulating layer INS1, the first sub insulating layer INS1a is disposed on the sensing electrode part SEP and covers the sensing electrode part SEP. The second sub insulating layer INS1b is disposed on the first sub insulating layer INS1a. The first sub insulating layer INS1a and the second sub insulating layer INS1b overlap in a touch area TA. The first sub insulating layer INS1a and the second sub insulating layer INS1b partially overlap in a non-touch area NTA. In the present exemplary embodiment, it is illustrated that the second sub insulating layer INS1b partially overlaps the first sub insulating layer INS1a. In this case, when viewed on a plane, a size (e.g., a width) of the second sub insulating layer INS1b may be larger than a size of the first sub insulating layer INS1a.

However, the sizes of the first sub insulating layer INS1a and the second sub insulating layer INS1b are not limited thereto. Referring to FIG. 5B, when viewed on a plane, a size (e.g., a width) of the second sub insulating layer INS1b may be smaller than a size of the first sub insulating layer INS1a. Referring to FIG. 5C, a size (e.g., a width) of the first sub insulating layer INS1a is smaller than a size of the second sub insulating layer INS1b. The second sub insulating layer INS1b may cover all of an upper surface and lateral surfaces of the first sub insulating layer INS1a in FIG. 5C. In addition, although not illustrated, according to the exemplary embodiment, the first sub insulating layer INS1a and the second sub insulating layer INS1b are provided with the same size and the same form to completely overlap each other. In this case, an end portion of the first sub insulating layer INS1a and an end portion of the second sub insulating layer INS1b may correspond to each other.

Referring to FIGS. 5A, 5B, and 5C, the second insulating layer INS2 may also be provided in a similar form to that of the first insulating layer INS1. That is, when viewed on a is plane, the first sub insulating layer INS2a is disposed at a side of an end portion of the touch sensor, and the second sub insulating layer INS2b is disposed on the first sub insulating layer INS2a. In the second insulating layer INS2, the first sub insulating layer INS2a may overlap at least a portion of the first sub insulating layer INS2a. In the present exemplary embodiment, a width of the trench TCH between the second sub insulating layer INS1b of the first insulating layer INS1 and the second sub insulating layer INS2b of the second insulating layer INS2 may be the same as or different from a width of the trench TCH between the first sub insulating layer INS1a of the first insulating layer INS1 and the first sub insulating layer INS2a of the second insulating layer INS2. As can be seen in the exemplary embodiments of FIGS. 5A, 5B, and 5C, a width of the trench TCH between the second sub insulating layer INS1b of the first insulating layer INS1 and the second sub insulating layer INS2b of the second insulating layer INS2 may be smaller or larger than a width of the trench TCH between the first sub insulating layer INS1a of the first insulating layer INS1 and the first sub insulating layer INS2a of the second insulating layer INS2. According to the exemplary embodiment, the thicknesses of the first sub insulating layer INS1a and the second sub insulating layer INS1b may be changed to various forms, and are not limited to the aforementioned exemplary embodiments. For example, a thickness of the first sub insulating layer INS1a may be different from a thickness of the second sub insulating layer INS1b. Referring to FIG. 5D, a thickness of the second sub insulating layer INS1b of the first insulating layer INS1 provided on the sensing electrode part SEP may be larger than a thickness of a thickness of the first sub insulating layer INS1a of the first insulating layer INS1. The thicknesses of the first and second insulating layers INS2a and INS2b of the second insulating layer INS2 may be provided in the same form as that of the first insulating layer INS1.

The aforementioned exemplary embodiments may be partially transformed or is combined so long as it is not contrary to the inventive concepts. For example, in the aforementioned exemplary embodiments, it is illustrated that the heights of the first insulating layer INS1 and the second insulating layer INS2 are substantially the same, but the present disclosure is not limited thereto, and the first insulating layer INS1 and the second insulating layer INS2 may have different heights. Further, in the exemplary embodiment illustrated in FIG. 5A, in the first insulating layer INS1 may have first and second sub insulating layers INS1a and INS1b with different thicknesses, similar to those of the exemplary embodiment illustrated in FIG. 5D.

The touch sensor may be manufactured by a method described below. Hereinafter, a method of manufacturing the touch sensor illustrated in FIG. 2 among the touch sensors will be sequentially described.

FIGS. 6A, 6B, 6C, 6D, 6E, 6F, and 6G are cross-sectional views sequentially illustrating a method of manufacturing the touch sensor according to an exemplary embodiment. In the drawings below, the case where one touch sensor is formed is illustrated as an example for convenience, but the present disclosure is not limited thereto. Instead, a plurality of touch sensors may be formed on one mother substrate, and then the mother substrate may be cut to form the touch sensor. A process of cutting the mother substrate will be described with reference to FIG. 7.

Figure 6A:
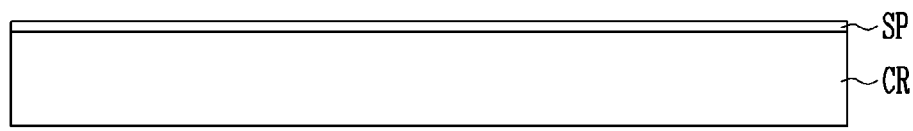
FIGS. 6A, 6B, 6C, 6D, 6E, 6F, 6G are cross-sectional views sequentially illustrating a method of manufacturing a touch sensor according to an exemplary embodiment.

Referring to FIG. 6A, the support layer SP is formed on a carrier substrate CR.

As long as the touch sensor may be formed on an upper surface of the carrier substrate CR, the carrier substrate CR is not particularly limited, and may be formed of glass or plastic.

The support layer SP is a layer for forming a sensing electrode part SEP, wires is (not illustrated), and a pad (not illustrated) forming the touch sensor, and is formed so as to easily separate the touch sensor from the carrier substrate CR after the touch sensor is manufactured.

The support layer SP may be manufactured by forming an organic polymer material on the carrier substrate CR and then hardening the organic polymer material.

The support layer SP may be formed in a single layer or multiple layers, and when the support layer SP is in the multiple layers, the process of forming the support layer SP may be repeated several times.

The support layer SP may be formed in various methods. For example, the support layer SP may be formed by a printing method, a coating method, a dispensing method, and the like. For example, the support layer SP may be formed by any one of a printing method, such as screen printing, inkjet printing, and nozzle printing, a coating method, such as slit coating, spin coating, and spray coating, and a dispensing method using a dispenser. In the exemplary embodiment, the support layer SP may be formed by the coating method.

The support layer SP may be easily manufactured by the aforementioned method, and may be manufactured with a very small thickness compared to that of the related art.

The carrier substrate CR and the hardened support layer SP are in a contact state, and may be bonded to each other by static electricity or van der Waals force. Here, the carrier substrate CR and the support layer SP are bonded, but the meaning of the bonding includes a contact of the surfaces of the carrier substrate CR and the support layer SP, but excludes a state where the carrier substrate CR and the support layer SP are chemically bonded (for example, covalent bond) and are not separated. A separate layer, such as a separate adhesive ADH, other than an air layer, is not interposed between the carrier substrate CR and the support layer SP. When force is applied from the outside of the carrier substrate CR and the support layer SP, the carrier substrate CR and the support layer SP are in a state of being easily separated without damage.

Figure 6B:
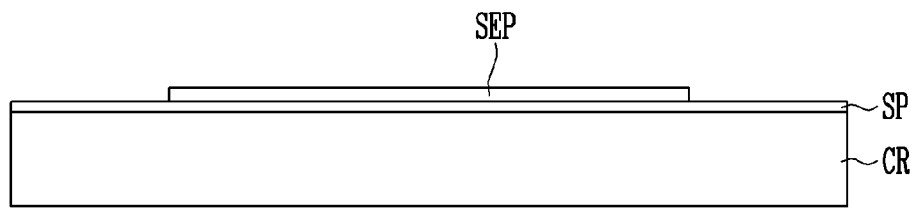

Referring to FIG. 6B, the sensing electrode part SEP is formed on the support layer SP. Although not illustrated, wires and/or a pad may be formed with the sensing electrode part SEP together or may be separately formed from the sensing electrode part SEP. The sensing electrode part SEP, the wires, and the pad may be formed with various method, such as chemical vapor deposition, physical vapor deposition, printing, and plating. For example, the electrode part SEP, the wires, and the pad may be manufactured by forming a conductive layer by using chemical vapor deposition and patterning the conductive layer by photolithography.

Figure 6C:
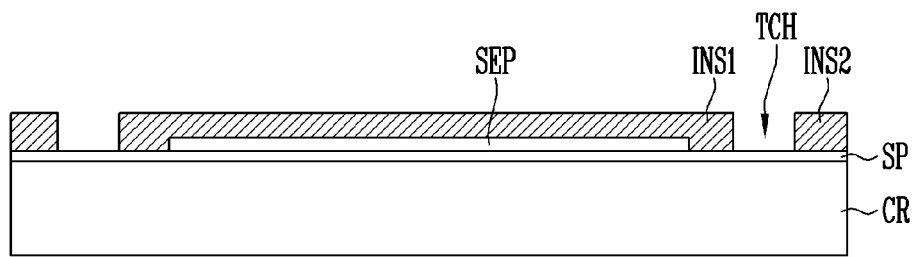

Referring to FIG. 6C, the insulating layer is formed on a substrate, on which the sensing electrode part SEP and the like are formed. The insulating layer is formed to have the trench TCH formed by removing a portion of the insulating layer in the non-touch area. The insulating layer INS is not provided on the support layer SP in an area corresponding to the trench TCH, so that an upper surface of the support layer SP is exposed.

The trench TCH is provided along a perimeter of the touch area TA when viewed on a plane. Accordingly, the insulating layer INS may be formed of the insulating layers INS1 and INS2, which are spaced apart from each other with the trench TCH interposed therebetween. The second insulating layer INS2 is provided along the perimeter of the first insulating layer INS1 at an external side of the first insulating layer INS1.

Further, the insulating layer is formed to have an opening exposing a pad connected to an end portion of the wire in an area corresponding to the pad in the non-touch area. An upper surface of the pad is exposed through the opening.

The insulating layer INS may be formed in various methods. For example, the insulating layer INS may be formed by a printing method, a coating method, a dispensing method, and the like. For example, the insulating layer INS may be formed by any one of a printing method, such as screen printing, inkjet printing, and nozzle printing, a coating method, such as slit coating, spin coating, and spray coating, and a dispensing method using a dispenser. In the exemplary embodiment, the insulating layer INS may be formed by the coating method.

In the insulating layer INS, the trench TCH and the opening may be provided by forming the insulating layer on a front surface of the carrier substrate CR and then patterning the insulating layer by using photolithography. Otherwise, the trench TCH and the opening may be formed by a method of forming the insulating layer only in a portion except for the area, in which the trench TCH or the opening is to be formed, during the printing, the coating, and the dispensing.

Here, the first insulating layer INS1 and the second insulating layer INS2 may be manufactured in a single process as described above, and thus, the first insulating layer INS1 and the second insulating layer INS2 may be formed of the same material. Further, the first insulating layer INS1 and the second insulating layer INS2 may substantially be formed with have the same height. However, the first insulating layer INS1 and the second insulating layer INS2 may be separately manufactured in different processes, so that even in this case, the first insulating layer INS1 and the second insulating layer INS2 are substantially formed to have the same height.

Figure 6D:
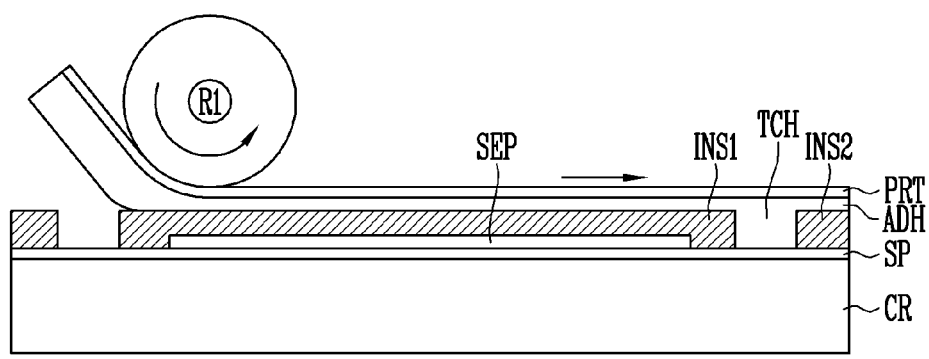

Referring to FIG. 6D the protection film PRT is attached on the carrier substrate CR, on which the insulating layer and the like are formed, with the adhesive ADH interposed therebetween. The protection film PRT and the adhesive ADH may be bonded by using a first is roller R1. That is, the protection film PRT may be attached onto the insulating layer by compressing the adhesive ADH and the protection film PRT onto the carrier substrate CR, on which the insulating layer and the like are formed, by using the first roller R1. In this case, the trench TC and the opening may be entirely or partially filled with the adhesive ADH.

Figure 6E:
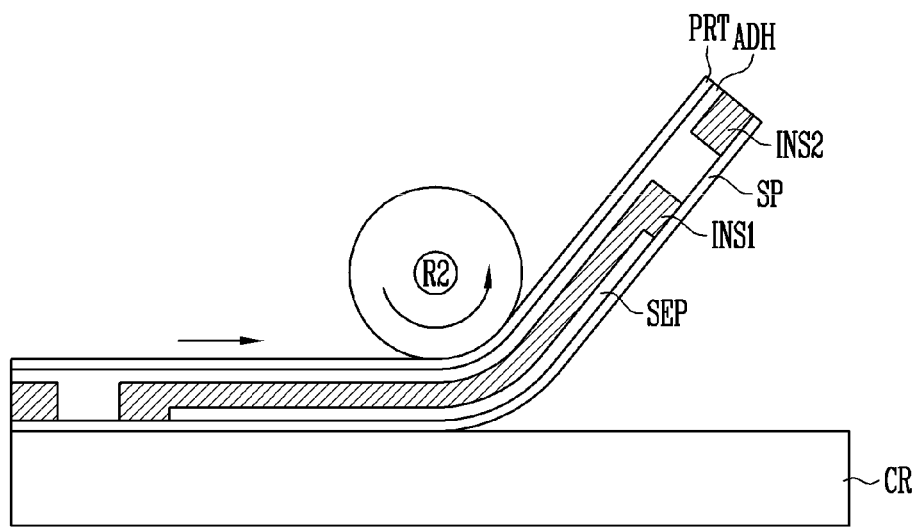

Referring to FIG. 6E, the used carrier substrate CR is removed in order to perform a touch sensor process. The method of removing the carrier substrate CR is not particularly limited, and a lift-off method or a peel-off method may be used. In the exemplary embodiment, the method of removing the carrier substrate CR is performed by a method of separating the support layer SP and the carrier substrate CR by using a second roller R2.

Figure 6F:
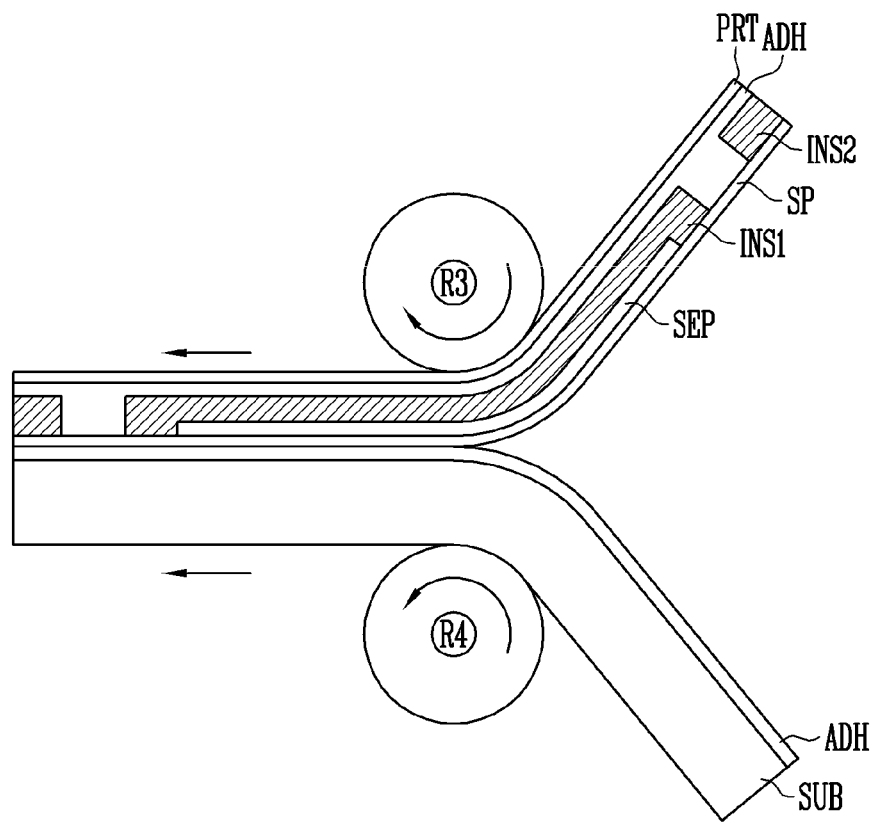

Referring to FIG. 6F, the touch sensor manufactured by the aforementioned method is bonded onto the substrate SUB. The touch sensor may be attached onto the substrate SUB with the adhesive ADH interposed therebetween. In the exemplary embodiment, the touch sensor is attached onto the substrate by disposing a third roller R3 and a fourth roller R4 so as to face each other, and making the substrate SUB formed with the adhesive ADH and the touch sensor pass between the third roller R3 and the fourth roller R4 while compressing the substrate SUB formed with the adhesive ADH and the touch sensor. That is, the touch sensor is separated from the carrier substrate CR by the roll-to-roll method and is transferred onto the substrate SUB. Herein, the substrate SUB may be an element, to which the touch sensor is desired to be attached, and various elements, for example, a display panel, a functional film, and a window, may be used.

Figure 6G:
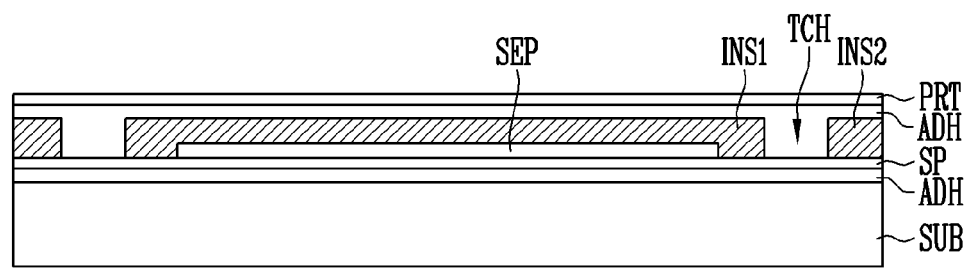

Referring to FIG. 6G, a final product formed by attaching the touch sensor onto the substrate through the aforementioned process is completed.

In the manufacturing method according to the exemplary embodiment, the touch is sensors may be separately formed one by one, but the plurality of touch sensors may also be simultaneously formed. FIG. 7 is a top plan view illustrating the case where the plurality of touch sensors is simultaneously manufactured according to an exemplary embodiment.

In the present exemplary embodiment, in order to describe the case where the plurality of touch sensors is simultaneously manufactured, a mother substrate M_SUB for forming six touch sensors is illustrated, but the present disclosure is not limited thereto, and the mother substrates M_SUB having various sizes may be used for forming the various number of touch sensors.

The present exemplary embodiment is partially different from the above case in that the plurality of touch sensors is simultaneously manufactured on the large mother substrate M_SUB, but the elements formed on each mother substrate M_SUB are substantially the same as the elements of the individual touch sensor. The manufacturing method is not substantially different except that a carrier substrate CR, a support layer SP, and the like having large sizes are prepared for simultaneously forming the plurality of touch sensors. The mother substrate M_SUB has a unit area UNT for forming each of the touch sensors, and the touch sensor is formed within each unit area UNT. The unit area UNT is cut along a cutting line CT later, and thus, the plurality of touch sensors may be simultaneously formed.

This will be described with reference to FIGS. 6A to 6F, and FIG. 7. First, a carrier substrate CR substantially having the same size as that of a mother substrate M_SUB may be prepared. A support layer SP is formed on the carrier substrate CR. The support layer SP has the plurality of unit areas UNT according to the number of touch sensors desired to be manufactured, and a sensing electrode part SEP, wires, a pad, and the like are formed in each unit area UNT of the support layer SP. Next, an insulating layer INS having a trench TCH is is formed in each of the unit areas UNT. A protection film PRT substantially having the same size as that of the mother substrate M_SUB is bonded onto each insulating layer INS with an adhesive ADH interposed therebetween, and next, the carrier substrate CR is removed. The touch sensors, in which the carrier substrate CR is removed, are bonded to the mother substrate M_SUB with the adhesive ADH interposed therebetween. The touch sensors formed on the mother substrate M_SUB are cut into the separate touch sensors by using a cutter, a laser, or the like to finally complete a touch sensor.

The touch sensor according to the exemplary embodiment having the aforementioned structure and manufactured by the aforementioned method has a decreased defect compared to the related art, which will be described below.

According to the related art, an insulating layer covering a sensing electrode part is extended up to an end portion of a support layer. In this case, a defect, such as a crack, may be generated in the end portion of the insulating layer during a process of cutting a mother substrate, and external gas (for example, oxygen) or moisture permeates into an inner side through the defect, so that there is a problem in that the sensing electrode part, wires, a pad, and the like are degraded. That is, there is a problem in that an ITO of the sensing electrode part, the wires, and the pad is corroded or a metal is oxidized, and the problem eventually causes an increase in resistance, a short circuit between the wires, the degradation of a detection of a touch, and the like.

When the insulating layer covers the touch area, but is not formed at the side of the end portion in order to prevent the problem, a step is generated in a portion, in which the insulating layer is not formed, during the compressive transfer in the roll-to-roll process, and the adhesive is not applied or applied in an amount that is too small due to a step difference. The is reason is that the adhesive is pushed to the outside by the compression during the transfer of the touch sensor in the roll-to-roll method and thus the adhesive is insufficiently applied or is not applied at the end portion. This results in a decrease in a thickness of the adhesive between the substrate and the touch sensor in the area of the end portion of the touch sensor. When the thickness of the adhesive is decreased between the substrate and the support layer, tensile strength of the touch sensor is decreased. The adhesive generally has predetermined elastic force and serves to relieve external stress, such as bending, but when a thickness of the adhesive is too small, elastic force is decreased and it is difficult to relieve external stress. As a result, a defect, such as a crack, is generated in the sensing electrode part, the wires, the pad, and the like by stress applied from the outside. For example, a crack may be generated in the wire even by stress of about 500 gF/cm.

In addition to this, the substrate and the support layer are easily detached, and the support layer is easily lifted from the substrate, so that external gas or moisture easily permeates into the sensing electrode part, the wires, the pad, and the like on the support layer. As a result, there is a problem in that the sensing electrode part, the wires, the pad, and the like in the end portion of the touch sensor are corroded or oxidized, and in this case, resistance is increased, a short circuit is generated between the wires, and a touch detection is degraded.

However, according to the exemplary embodiment, the first insulating layer and the second insulating layer, which are spaced apart from each other with the trench interposed therebetween, are formed, so that the aforementioned defect is prevented.

In the present disclosure, the first insulating layer covering the sensing electrode part and the like is formed, but is not formed in the end portion of the external side of the touch side and is not exposed to the outside. Accordingly, when the cutting process and the like is is performed, a defect, such as a crack, is not generated in the first insulating layer. In addition to this, the second insulating layer is provided along an outer side of the touch sensor, and the heights of the first insulating layer and the second insulating layer are substantially the same, so that the phenomenon, in which the adhesive is not sufficiently applied, during the compression using the roll-to-roll method, is considerably decreased. The reason is that the second insulating layer serves as a spacer, so that a pressing phenomenon of the adhesive is decreased during the compression in the end portion of the touch sensor.

Table 1 below represents a result of a defect evaluation of the touch sensor according to a time in a high temperature high moisture environment in the touch sensor of the related art. Table 2 below represents a result of a defect evaluation of the touch sensor according to a time in a high temperature high moisture environment in the touch sensor according to the exemplary embodiment.

The touch sensors used in Tables 1 and 2 are manufactured under the same conditions, except for a shape of an insulating layer. The sensing electrode parts of the touch sensors used in Tables 1 and 2 are formed of an ITO single layer, and the wires are formed of dual layers of an ITO layer and an aluminum/palladium/copper alloy layer.

The touch sensor of Table 1 is manufactured in such a manner that the insulating layer is not extended up to the end portion of the touch sensor. The touch sensor of Table 2 is manufactured in such a manner that a form of the first insulating layer is the same as that of Table 1, but the first insulating layer and the second insulating layer, which is spaced apart from the first insulating layer with the trench interposed therebetween, are formed in the end portion of the touch sensor. A defect of the touch sensor was evaluated based on corrosion of an ITO layer and a bridge and a defect by a disconnection and a short circuit of the wires.

TABLE 1

| | Time (hrs.) | | | |
|---|---|---|---|---|
| | 120 | 240 | 360 | 500 |
| Number of specimens | 80 | 80 | 80 | 78 |
| Number of defects | 0 | 2 | 0 | 9 |

TABLE 2

| | Time (hrs.) | | | |
|---|---|---|---|---|
| | 120 | 240 | 360 | 500 |
| Number of specimens | 126 | 126 | 126 | 126 |
| Number of defects | 0 | 0 | 0 | 0 |

As can be seen in Tables 1 and 2, the touch sensor according to the related art has a defect in a high temperature and humid environment, and particularly, a defect is generated in nine touch sensors among 78 specimens after 500 hours. In contrast, the touch sensor according to the present disclosure have no defect in all of the hours.

Figure 8:
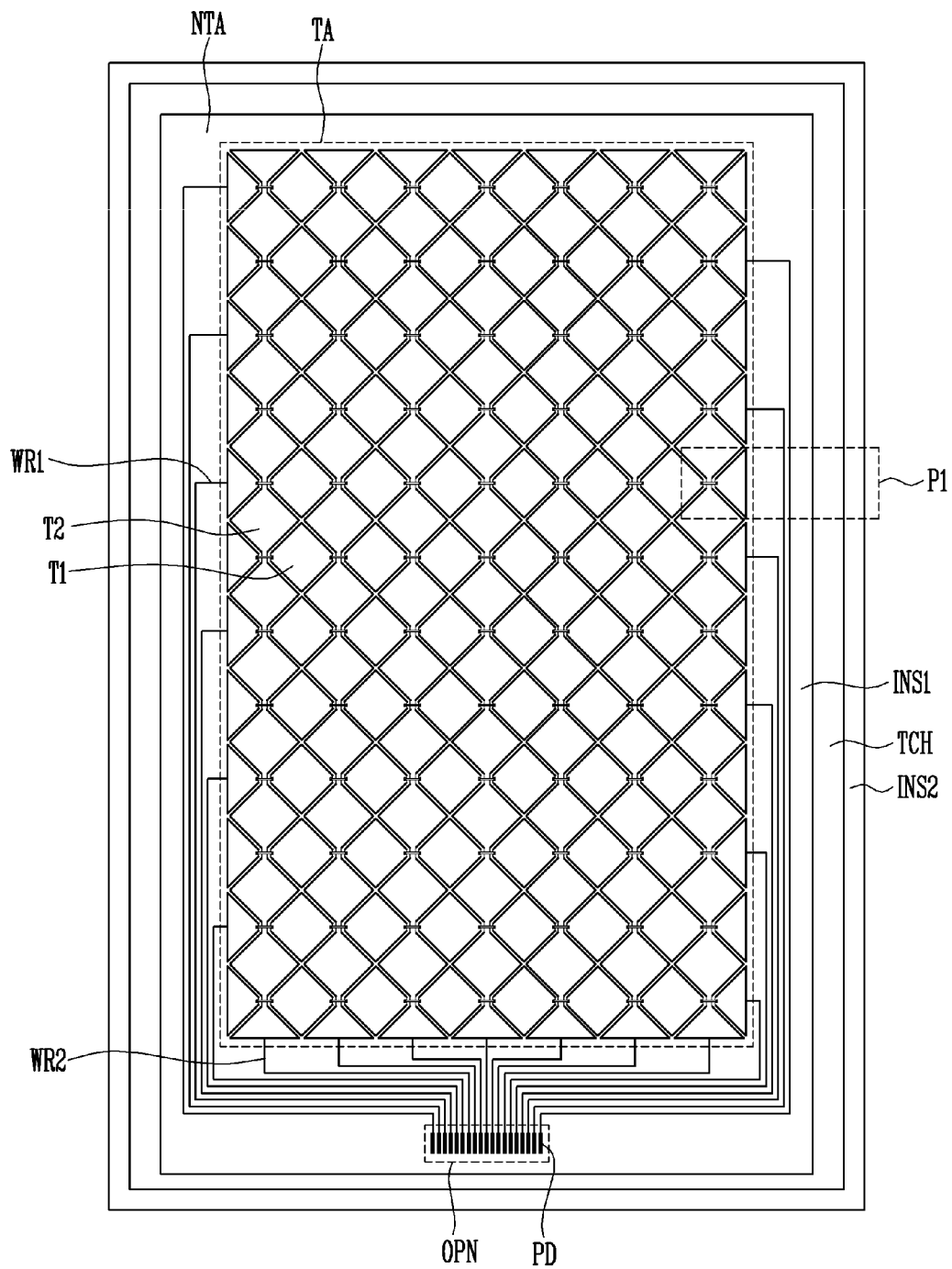
FIG. 8 is a top plan view illustrating a touch sensor according to an exemplary embodiment.
Figure 9:
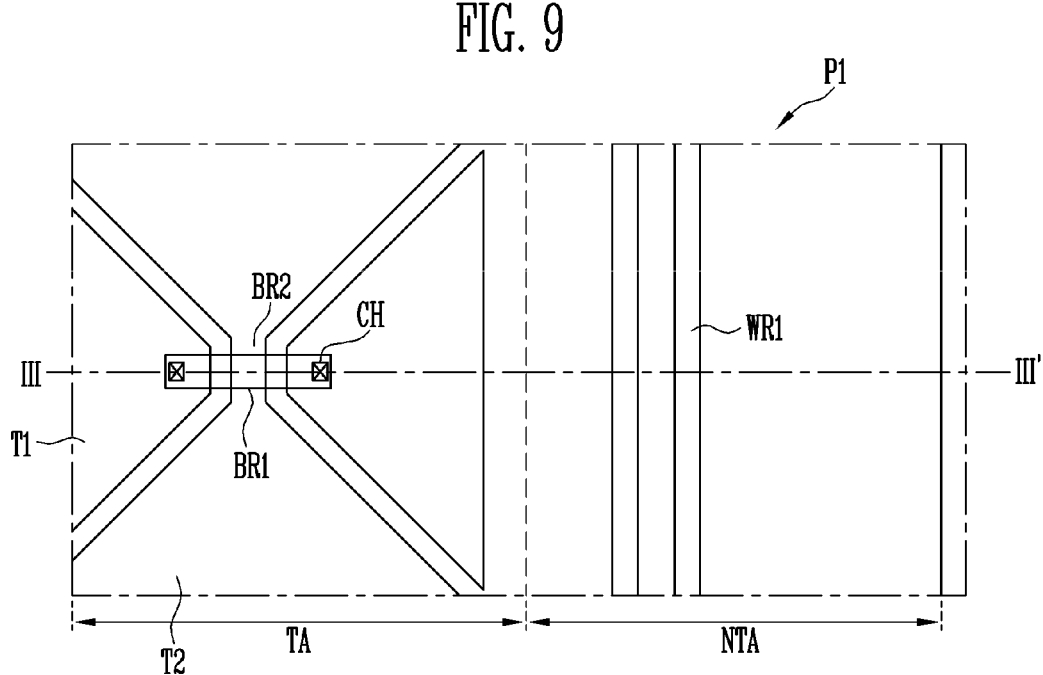
FIG. 9 is a cross-sectional view of an enlarged portion PI of FIG. 8.
Figure 10:
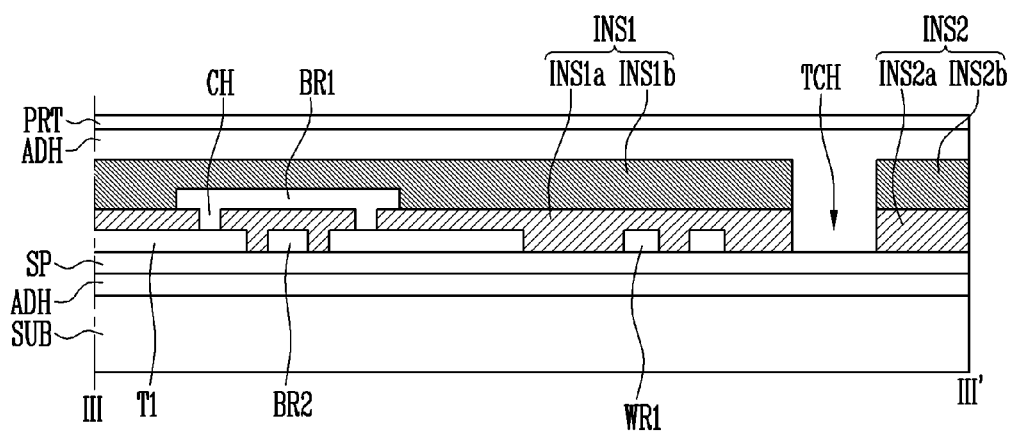
FIG. 10 is a cross-sectional view taken along line of FIG. 9.

The touch sensor according to the exemplary embodiment may be implemented in various forms. FIG. 8 is a top plan view illustrating a touch sensor according to an exemplary embodiment, and particularly, illustrates one example of a sensing electrode part SEP. FIG. 9 is a cross-sectional view of an enlarged portion PI of FIG. 8. FIG. 10 is a cross-sectional view taken along line of FIG. 9.

The touch sensor according to the exemplary embodiment is a capacitance type, and may be provided in a mutual capacitance type and/or a self-capacitance type. In the exemplary embodiment below, the present disclosure will be described based on the touch sensor in the mutual capacitance type as an example, but is not limited thereto.

First, referring to FIGS. 9 and 10, the touch sensor according to the exemplary embodiment includes first touch electrodes T1, second touch electrodes T2, first and second wires WR1 and WR2, and pads PD. The first touch electrodes T1 and the second touch electrodes T2 are provided in a touch area TA.

In a non-touch area NTA of the touch sensor, the first wires WR1 electrically connected with the first touch electrodes T1 may be provided, and further, the second wires WR2 electrically connected with the second touch electrodes T2 may be provided. Here, the first wires WR1 may be connected to one end of a series of connected first touch electrodes T1, and the second wires WR2 may also be connected to one end of a series of connected second touch electrodes T2.

In the exemplary embodiment, a sensor controller (not illustrated) may be provided in the touch sensor TS. The sensor controller may be provided in a form of a printed circuit board (PB), a tape carrier package, or a chip-on-film, and may be electrically connected to the pads through separate wires WR, a connector, and the like. Herein, the printed circuit board or the tape carrier package may have flexibility.

The first touch electrodes T1 are formed on a support layer SP in, for example, an X-axis direction (e.g., a horizontal direction). For example, each of the first touch electrodes T1 may be arranged in the same row in the X-axis direction. The first touch electrodes T1 arranged in each row may include a plurality of first bridges BR1 connecting the first touch electrodes T1 adjacent in the X-axis direction.

The first touch electrodes T1 are connected to the pads PD through the first wires WR1, respectively.

The second touch electrodes T2 are formed on the support layer SP in, for example, a Y-axis direction. For example, each of the second touch electrodes T2 may be arranged in the same column in the Y-axis direction. The second touch electrodes T2 arranged in each column may include a plurality of second bridges BR2 connecting the second touch electrodes T2 adjacent in the Y-axis direction.

The second touch electrodes T2 are connected to the pads PD through the second wires WR2, respectively.

In the exemplary embodiment, the first bridges BR1 may be integrally formed with the first touch electrodes T1 in the corresponding row without a separation. Otherwise, the second bridges BR2 may be integrally formed with the second touch electrodes T2 in the corresponding column without a separation. However, the present disclosure is not limited thereto, and the first bridges BR1 and/or the second bridges BR2 may also be changed to have a structure including one or more bridges and be implemented.

For convenience of the description, the present exemplary embodiment discloses a case where the number of first bridges BR1 and the number of second bridges BR2 between the two adjacent first touch electrodes T1 is one, but the number of first bridges BR1 and the number of second bridges BR2 may be variously changed.

In the exemplary embodiment, FIG. 8 illustrates that the first and second touch electrodes T1 and T2 are shaped like a diamond, but the shapes of the first and second touch electrodes T1 and T2 may be variously changed. For example, the first and second touch electrodes T1 and T2 may be implemented in a circular shape.

In the exemplary embodiment, when the first touch electrodes T1 are driving electrodes and the second touch electrodes T2 are receiving electrodes, the first touch electrodes is T1 may receive driving signals from the sensor controller through the pads PD, respectively, and the second touch electrodes T2 may output detection signals by a touch of a user to the sensor controller through the pads PD, respectively. In this case, the touch sensor of the exemplary embodiment may be driven in the mutual capacitance method.

In the meantime, in the drawings, the first and second touch electrodes T1 and T2 are disposed in the X-direction and the Y-direction, respectively, but the present disclosure is not limited thereto. For example, the first touch electrodes T1 and/or the second touch electrodes T2 may also disposed in a direction, for example, a diagonal direction, other than the X-axis direction and the Y-axis direction.

In the exemplary embodiment, although not illustrated, at least a portion of the first touch electrodes T1 and the second touch electrodes T2 is provided in a mesh form formed of thin lines. For example, at least one of the first touch electrodes T1 and the second touch electrodes T2 may be formed to include one or more mesh-type conductive layers. For example, at least one of the first touch electrodes T1 and the second touch electrodes T2 may be provided in a form, in which thin lines extended in different directions cross one another, and the thin lines are connected to each other in crossing points when viewed on a plane. That is, when viewed on a plane, the first and second touch electrodes T1 and T2 are provided in a form, in which a plurality of openings OPN is formed inside the first and second touch electrodes T1 and T2.

In the exemplary embodiment, each of the first and/or second touch electrodes T1 and T2 includes a conductive material. A metal, a metal oxide, a conductive polymer, metal nano wire, carbon nano tube, graphene, and the like may be used as the conductive material. The metal may include at least one of cooper, silver, gold, platinum, palladium, nickel, tin, aluminum, cobalt, rhodium, iridium, iron, ruthenium, osmium, manganese, molybdenum, is tungsten, niobium, tantalum, titanium, bismuth, antimony, lead, zinc, and an alloy thereof. The conductive metal oxide may include at least one of transparent metal compounds, such as an Indium Tin Oxide (ITO), an Indium Zinc Oxide (IZO), an Antimony Zinc Oxide (AZO), an Indium Tin Zinc Oxide (ITZO), a Zinc Oxide (ZnC), and a Tin Oxide ($SnO_2$), in addition to the aforementioned oxides of the metal. The conductive polymer may include a polythiophene-based compound, a polypyrrole-based compound, a polyaniline-based compound, a polyacetylene-based compound, and a polyphenylenether-based compound, and a mixture thereof, and particularly, may include a PEDOT/PSS compound among the polythiophene-based compounds. In the exemplary embodiment, the first and second touch electrodes T1 and T2 may be formed in a single layer or multiple layers.

The first bridge BR1 may include the aforementioned material of the first and/or second touch electrodes T1 and T2.

According to the exemplary embodiment, one of the first and second touch electrodes T1 and T2 may be a driving electrode, and the other may be a receiving electrode. When a user inputs a touch to the first and second touch electrodes T1 and T2 or an area around the first and second touch electrodes T1 and T2, mutual capacitance between the driving electrode and the receiving electrode may be changed. The sensor controller may detect whether the user inputs the touch and a touch position by detecting a variation of mutual capacitance between the driving electrode and the receiving electrode.

Next, a lamination relation will be described below with reference to FIGS. 9 and 10.

The first touch electrodes T1, the second touch electrodes T2, the second bridges BR2, the first and second wires WR1 and WR2, and the pads PD are provided on the support is layer SP.

The substrate SUB may be provided under the support layer SP, and an adhesive ADH may be interposed between the support layer SP and the substrate.

First sub insulating layers INS1a INS2a are disposed on the first touch electrodes T1, the second touch electrodes T2, the second bridges BR2, the first and second wires WR1 and WR2, and the pads PD. The first sub insulating layers INS1a INS2a include a first sub insulating layer INS1a of a first insulating layer INS1 and a first sub insulating layer INS2a of a second insulating layer INS2, which are spaced apart from each other with a trench TCH interposed therebetween.

Contact holes CH exposing upper surfaces of the first touch electrodes T1 are provided in the first sub insulating layer INS1a of the first insulating layer INS1.

The first bridge BR1 connecting the adjacent first touch electrodes T1 is provided on the first sub insulating layer INS1a of the first insulating layer INS1. The first bridges BR1 are connected to the adjacent first touch electrodes T1 through the contact hole CH.

Second sub insulating layers INS1b and INS2b are provided on the first sub insulating layers INS1a and INS2a. The second sub insulating layers INS1b INS2b include a second sub insulating layer INS1b of the first insulating layer INS1 and a second sub insulating layer INS2b of the second insulating layer INS2, which are spaced apart from each other with the trench TCH interposed therebetween.

At least parts of the second sub insulating layers INS1b and INS2b overlap the first sub insulating layers INS1a and INS2a, and end portions of the external sides of the first sub insulating layers INS1a and INS2a and the second sub insulating layers INS1b and INS2b may correspond to each other or may be disposed at different positions when viewed on a plane.

The protection film PRT may be provided on the second sub insulating layers INS1b and INS2b with the adhesive ADH interposed therebetween.

As described above, the touch sensor of the mutual capacitance type may include the two laminated sub insulating layers INS, and may include the first insulating layer INS1 and the second insulating layer INS2, which are divided based on the trench TCH formed along a perimeter of the touch area TA.

It is illustrated that in the touch sensor according to the present exemplary embodiment, the bridge is formed at an upper side of the touch electrode, but the present disclosure is not limited thereto. Instead, the touch sensor may be implemented in a structure, in which the bridges are formed at lower sides of the touch electrodes. Further, in the present exemplary embodiment, a structure, in which the first touch electrodes T1 and the second touch electrodes T2 are substantially disposed on the same layer, is illustrated, but the present disclosure is not limited thereto. For example, according to an exemplary embodiment, the first touch electrodes T1 and the second touch electrodes T2 may also be disposed in the different layers.

The touch sensor according to the exemplary embodiment may be applied into a display device by various schemes. FIGS. 11A, 11B, 11C, and 11D are cross-sectional views illustrating display devices according to exemplary embodiments.

Figure 11A:
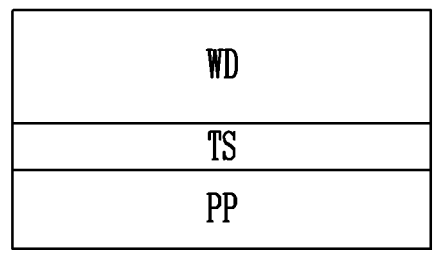
FIGS. 11A, 11B, 11C, and 11D are cross-sectional views illustrating display devices according to exemplary embodiments.

Referring to FIG. 11A, a display device according to an exemplary embodiment may include a display panel PP displaying an image, a window WD provided on a front surface of the display panel PP, and a touch sensor TS provided between the display panel PP and the window WD.

The window WD may be provided in a plate shape corresponding to a shape of is the display panel PP, and covers at least a portion of the front surface of the display panel PP. For example, when the display panel PP is provided in a rectangular shape, the window WD may also be provided in a rectangular shape corresponding to the rectangular shape of the display panel PP. Otherwise, when the display panel PP is provided in a circular shape, the window WD may also be provided in a circular shape corresponding to the circular shape of the display panel PP.

The window WD allows an image from the display panel PP to pass through and relieves external impact, thereby preventing the display panel PP from being damaged or erroneously operated by the external impact. The impact from the outside refers to power from the outside expressible as pressure and stress, and means power causing a defect to the display panel PP.

The entirety or at least a portion of the window WD may have flexibility. For example, the window WD may have flexibility in an entire area, or may have flexibility in an area corresponding to a flexible area.

The touch sensor TS may be disposed between the display panel PP and the window WD.

In the exemplary embodiment, the touch sensor TS may be bonded onto the display panel PP with an adhesive interposed therebetween. In this case, in the touch sensor TS according to the exemplary embodiments, an element corresponding to the substrate is the display panel PP. In another exemplary embodiment, the touch sensor TS may be bonded onto the window WD with an adhesive interposed therebetween. In this case, in the touch sensor TS according to the exemplary embodiments, an element corresponding to the substrate is the window WD.

Otherwise, in the exemplary embodiments, the protection film PRT is for the purpose of temporarily protecting the touch sensor TS, so that the protection film PRT may be removed. Accordingly, after the protection film PRT in an upper portion is removed in a state where the substrate of the touch sensor TS is maintained, the display panel PP or the window WD, instead of the protection film PRT, may be attached to the touch sensor TS with the adhesive interposed therebetween.

According to the exemplary embodiments, according to an element, to which the touch sensor TS is attached, or a disposition position of the touch sensor TS, the upper surface and the lower surface of the touch sensor TS may be inverted. However, it is preferable to include an operation of exposing an upper surface of the pad so that separate wires WR, a flexible printed circuit board, a tape carrier package, a connector, a chip on film, and the like are connectable.

Figure 11B:
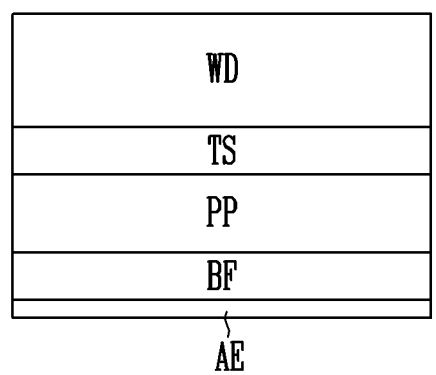

Referring to FIG. 11B, a display device according to an exemplary embodiment may include a display panel PP displaying an image, a window WD provided on a front surface of the display panel PP, a touch sensor TS provided between the display panel PP and the window WD, and a buffer member BF and an additional sensor AE provide at an external side of the display panel PP.

The additional sensor AE is for the purpose of detecting a pressure of a touch when a user inputs the touch. The additional sensor AE may be sensors of various schemes, for example, a capacitive sensor detecting capacitance with the touch sensor TS. In this case, the additional sensor AE may be formed of a conductive material, for example, the materials of the sensing electrode part or the wires, but is not limited thereto.

The buffer member BF may be provided to the touch sensor TS and the additional is sensor AE, and in the present exemplary embodiment, it is illustrated that the buffer member BF is provided between the display panel PP and the additional sensor AE. The buffer member BF may serve to relieve impact from the outside, and to this end, the buffer member BF may have elastic force. For example, the buffer member BF may be transformed by a pressure from the outside, and may have elastic force, by which the buffer member BF is restorable to an original state, when the pressure from the outside is removed.

The disposition positions of the buffer member BF and/or the additional sensor AE are not limited thereto, and the buffer member BF and/or the additional sensor AE may be disposed at different positions in other exemplary embodiments.

Figure 11C:
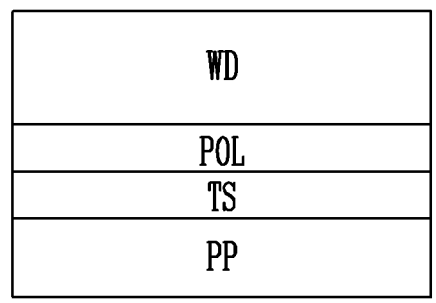

Referring to FIG. 11C, a display device according to an exemplary embodiment may include a display panel PP displaying an image, a window WD provided on a front surface of the display panel PP, a polarizing layer POL provided between the display panel PP and the window WD, and a touch sensor TS provided between the display panel PP and the polarizing layer POL.

The touch sensor TS may be disposed between the display panel PP and the polarizing layer POL.

In the exemplary embodiment, the touch sensor TS may be bonded onto the display panel PP with an adhesive interposed therebetween. In this case, in the touch sensor TS according to the exemplary embodiments, an element corresponding to a substrate is the display panel PP. In another exemplary embodiment, the touch sensor TS may be bonded onto the polarizing layer POL with an adhesive interposed therebetween. In this case, in the touch sensor TS according to the exemplary embodiments, an element corresponding to the substrate is the polarizing layer POL.

Otherwise, in the exemplary embodiments, after a protection film PRT in an upper portion is removed in a state where the substrate of the touch sensor TS is maintained, the display panel PP or the polarizing layer POL, instead of the protection film PRT, may be attached to the touch sensor TS with the adhesive interposed therebetween.

Figure 11D:
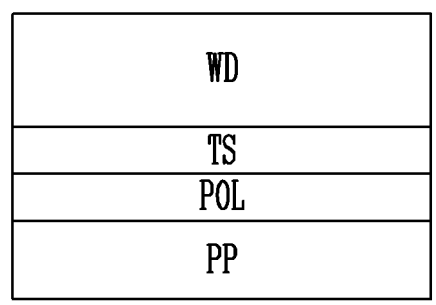

Referring to FIG. 11D, a display device according to an exemplary embodiment may include a display panel PP displaying an image, a window WD provided on a front surface of the display panel PP, a polarizing layer POL provided between the display panel PP and the window WD, and a touch sensor TS provided between the polarizing layer POL and the window WD.

The touch sensor TS may be disposed between the polarizing layer POL and the window WD.

In the exemplary embodiment, the touch sensor TS may be bonded onto the polarizing layer POL with an adhesive interposed therebetween. In this case, in the touch sensor TS according to the exemplary embodiments, an element corresponding to a substrate is the polarizing layer POL. In another exemplary embodiment, the touch sensor TS may be bonded onto the window WD with an adhesive interposed therebetween. In this case, in the touch sensor TS according to the exemplary embodiments, an element corresponding to the substrate is the window WD.

Otherwise, in the exemplary embodiments, after a protection film PRT in an upper portion is removed in a state where the substrate of the touch sensor TS is maintained, the polarizing layer POL or the window WD, instead of the protection film PRT, may be attached to the touch sensor TS with the adhesive interposed therebetween.

The touch sensor according to the exemplary embodiment may be applied to is various display devices. The display device may be applied to various electronic devices. For example, the display device may be an element applied to a television, a notebook computer, a mobile phone, a smart phone, a smart pad, a Portable Multimedia Player (PDP), a Personal Digital Assistant (PDA), a navigation device, various wearable devices, such as a smart watch, and the like.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch sensor, comprising:
   a support layer comprising a touch area and a non-touch area surrounding the touch area;
   a sensing electrode part disposed on one side of the support layer in the touch area; and
   an insulating layer disposed on the one side of the support layer in the touch area and in a portion of the non-touch area,
   wherein the insulating layer has a trench disposed along a perimeter of the touch area in the non-touch area to fully surround the touch area,
   wherein the insulating layer comprises:

a first insulating part disposed in the touch area and in a portion of the non-touch area that is directly adjacent to the touch area; and a second insulating part disposed along a perimeter of the first insulating part in the non-touch area with the trench interposed between the first insulating part and the second insulating part, and wherein the one side of the support layer is exposed in the trench, and wherein the first insulating part is not interposed between the support layer and the sensing electrode part.

2. The touch sensor of claim 1, wherein at least one of the first insulating part and the second insulating part comprises multiple layers.

3. The touch sensor of claim 2, wherein the first insulating part and the second insulating part each comprise a first sub insulating layer disposed on the support layer and a second sub insulating layer covering the first sub insulating layer.

4. The touch sensor of claim 1, wherein the sensing electrode part comprises first touch electrodes and second touch electrodes that are spaced apart from the first touch electrodes and are configured to form capacitance with the first touch electrodes.

5. The touch sensor of claim 4, wherein the sensing electrode part comprises a first bridge connecting adjacent first touch electrodes, among the first touch electrodes, and a second bridge connecting adjacent second touch electrodes, among the second touch electrodes.

6. The touch sensor of claim 5, wherein the insulating layer comprises a first sub insulating layer and a second sub insulating layer, which are sequentially disposed on the first touch electrodes and the second touch electrodes, and
one of the first bridge and the second bridge is disposed on the first sub insulating layer.

7. The touch sensor of claim 1, further comprising:
a substrate disposed on an external side of the support layer.

8. The touch sensor of claim 7, wherein the substrate is one of a display panel, a polarizing layer, and a window.

9. The touch sensor of claim 1, wherein a number of trenches is two or more.

10. The touch sensor of claim 1, further comprising:
a protection film disposed on the insulating layer.

11. The touch sensor of claim 1, wherein the trench comprises an air path configured to allow a gas to externally discharge from the trench.

12. A display device, comprising:
a display panel; and
a touch sensor disposed on an upper surface of the display panel, wherein the touch sensor comprises:
  a support layer comprising a touch area and a non-touch area surrounding the touch area;
  a sensing electrode part disposed on one side of the support layer in the touch area; and
  an insulating layer disposed on the one side of the support layer in the touch area and in a portion of the non-touch area, and
wherein the insulating layer has a trench disposed along a perimeter of the touch area in the non-touch area to fully surround the touch area, wherein the insulating layer comprises a first insulating part disposed in the touch area and in a portion of the non-touch area that is directly adjacent to the touch area, and a second insulating part disposed along a perimeter of the first insulating part in the non-touch area with the trench interposed therebetween, wherein the one side of the support layer is exposed in the trench, and wherein the second insulating part has one or more air paths connected to the trench.

13. The display device of claim 12, wherein the display panel and the support layer are bonded to each other with an adhesive interposed between the display panel and the support layer.

14. The display device of claim 12, further comprising:
a window provided on the touch sensor,
wherein the support layer and any one of the window and the display panel are bonded to each other with an adhesive interposed therebetween.

15. The display device of claim 12, further comprising:
a window disposed on the display panel, and
a polarizing layer disposed between the display panel and the window,
wherein the touch sensor is disposed between the window and the polarizing layer or between the polarizing layer and the display panel.

16. The display device of claim 15, wherein the support layer and at least one of the window, the polarizing layer, and the display panel are bonded to each other with an adhesive interposed therebetween.

17. A method of manufacturing a touch sensor, comprising:
forming a support layer on a carrier substrate;
forming a touch electrode pattern on one side of the support layer;
forming the touch sensor by forming an insulating layer on the touch electrode pattern;
separating the touch sensor from the carrier substrate; and
attaching the touch sensor onto a substrate,
wherein the insulating layer is formed in a touch area and a non-touch area surrounding the touch area, and the insulating layer has a trench disposed along a perimeter of the touch area in the non-touch area to fully surround the touch area,
wherein the insulating layer comprises a first insulating part disposed in the touch area and in a portion of the non-touch area that is directly adjacent to the touch area, and a second insulating part disposed along a perimeter of the first insulating part in the non-touch area with the trench interposed therebetween,
wherein the one side of the support layer is exposed in the trench, and
wherein the first insulating part is not interposed between the support layer and the sensing electrode part.

18. The method of claim 17, wherein the attaching of the touch sensor onto the substrate is performed by a roll-to-roll method.

* * * * *